United States Patent [19]

Fincher, Sr.

[11] Patent Number: 4,856,224

[45] Date of Patent: Aug. 15, 1989

[54] FISHING RIG RETAINER

[76] Inventor: Harold L. Fincher, Sr., 204 E. 24th St., Holland, Mich. 49423

[21] Appl. No.: 134,961

[22] Filed: Dec. 18, 1987

[51] Int. Cl.$^4$ ............................................. A01K 91/04
[52] U.S. Cl. ...................................... 43/43.12; 43/43.1; 43/44.95
[58] Field of Search ................... 43/43.12, 43.1, 44.88, 43/44.9, 44.91, 44.92, 44.93, 44.95

[56] References Cited

U.S. PATENT DOCUMENTS

| | | | |
|---|---|---|---|
| 3,816,954 | 6/1974 | Bissonette | 43/43.12 |
| 3,874,110 | 4/1975 | Larson | 43/43.12 |
| 3,959,913 | 6/1976 | Weber | 43/43.12 |
| 4,205,478 | 6/1980 | Emory | 43/44.88 |
| 4,221,068 | 9/1980 | Roemer, Jr. | 43/43.12 |
| 4,538,372 | 9/1985 | Petigoretz | 43/43.12 |
| 4,702,033 | 10/1987 | Shaw | 43/43.12 |

FOREIGN PATENT DOCUMENTS 716271  7/1965  Canada ............................ 43/44.88

Primary Examiner—Kurt Rowan
Attorney, Agent, or Firm—Waters, Morse & Harrington

[57] ABSTRACT

A fishing rig retainer for attaching a seondary fishing rig to a primary fishing line comprises a body that slides along the primary fishing line and a clamp attached to the body for holding the body in a selected position on the primary fishing line. The secondary fishing rig is operably connected to the clamp and causes the clamp to release when a fish takes the secondary fishing rig. This lets the body slide toward the end of the primary fishing line and facilitates release of the primary fishing line from a downrigger release clip.

5 Claims, 1 Drawing Sheet

FISHING RIG RETAINER

BACKGROUND OF THE INVENTION

This invention relates to fishing line systems and fishing rigs. Specifically, the present invention relates to a fishing lure attachment device that allows the fastening of two or more fishing lures to a downrigger system.

The pursuit of certain types of game fish, such as salmon and trout, has resulted in the development of a technique employing the use of a downrigger device, which is a releasable weight system that allows a fishing rig to be accurately positioned at a particular depth during a trolling operation. In the typical downrigger setup, a fish striking the fishing rig causes tension to be exerted on the fishing line, thereby releasing the line from the downrigger weight, allowing the fisherman to boat his catch. It is important for the downrigger to remain attached to the fishing rig until the time the fish strikes in order to insure the fishing rig stays at the proper depth.

One of the reasons why downriggers have become popular is the increasing use of sonar, or "fish finder", devices that allow a fisherman to determine the location and depth of a school of game fish. By using a downrigger, the fisherman is assured that the lure is going to be presented somewhat in the vicinity of the located fish.

Until now fishermen generally have employed a single fishing rig with a downrigger system, in order to ensure positive disengagement of the downrigger when a fish strikes the lure. While deploying additional fishing rigs at different positions along the same line would increase the fisherman's chance of a bite, this has previously been impractical because the distance of a second or a third rig from the downrigger weight would be too great for the pull of a fish striking the lure to cause the primary fishing line to disengage from the downrigger weight.

With the above in mind, it is an object of the present invention to provide a means for attaching an additional fishing rig to a fishing line in a manner that is still compatible with the use of a downrigger system.

SUMMARY OF THE INVENTION

A fishing rig retainer of the present invention allows the installation of an additional fishing rig to a fishing line in a downrigger system. The fishing rig retainer comprises a retention means and a connection means where the fishing rig itself is attached to the connection means. The retention means is slidably attached to the fishing line, but it may be engaged or anchored at any point along the fishing line. The connection means actuates the engagement and disengagement of the retention means on the fishing line. Disengagement is purposefully caused by the action of a fish striking the lure and transmitting this to the connection means.

DESCRIPTION OF THE PREFERRED EMBODIMENT

Figure 1:
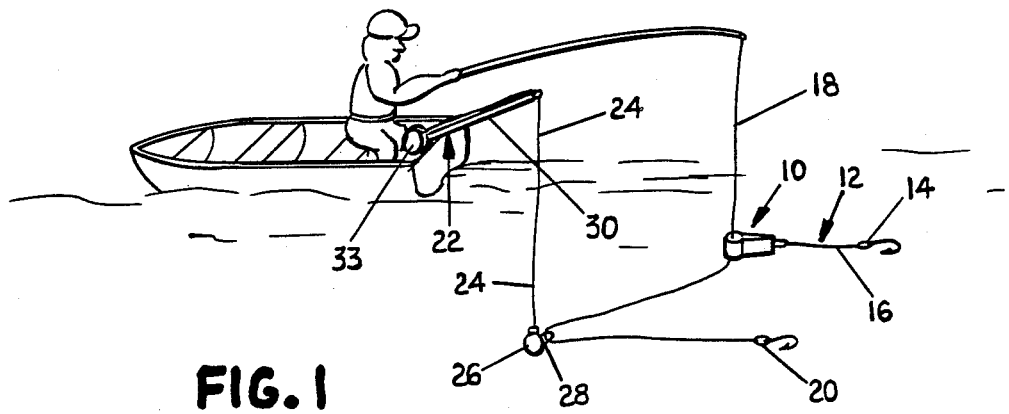
FIG. 1 is a perspective diagrammatic view showing the present invention employed in conjunction with a downrigger and dual fishing rigs.

Turning now to the drawings, FIG. 1 shows a fishing rig retainer of the present invention in a typical application. The fishing rig retainer 10 is shown attached to a primary fishing line 18. The primary fishing line extends through the retainer and ultimately connects with a first fishing lure or hook 20. The fishing line is connected to a downrigger release clip 28 which is found on the downrigger weight 26. The downrigger weight is fastened to the downrigger system 22 by means of a downrigger cable 24, which is wound on a downrigger reel 32 and threaded through a downrigger pole 30. Trailing from the end of the retainer is a second fishing rig 12, which typically comprises a second fishing lure or hook 14 and a line or leader 16 that connects the fishing lure to the fishing rig retainer.

The use of a downrigger system when fishing for game fish allows the sportsman to position the lure at a specific depth during a trolling operation. This is accomplished by using a downrigger weight 26 with a release clip 28 that is connected to the fishing line above the first lure. This arrangement allows the lure to be positioned at the correct depth regardless of the trolling speed of the boat or the buoyancy of the lure The actual measurement of the depth is obtained by an indicator attached to the downrigger reel (not shown) that automatically measures the amount of cable 24 played out from the reel 32. The fishing line is released from the downrigger weight by the release clip 28 when a fish strikes the lure This allows the fisherman to play the fish directly without the burden of the heavy downrigger weight on the fishing line.

With the present invention, a second lure can be positioned as shown in FIG. 1 at a predetermined position above the downrigger assembly There are at least two distinct advantages to having more than one lure on the same fishing line; the first being the increased chance for a fish to strike, and the second being the ability to position lures at two different levels in order to account for slight variations in the depth adjustment of the downrigger system.

The fishing rig retainer remains attached to the fishing line at all times, although it can be selectively anchored or engaged at particular positions along the fishing line, as will be explained further.

Figure 2:
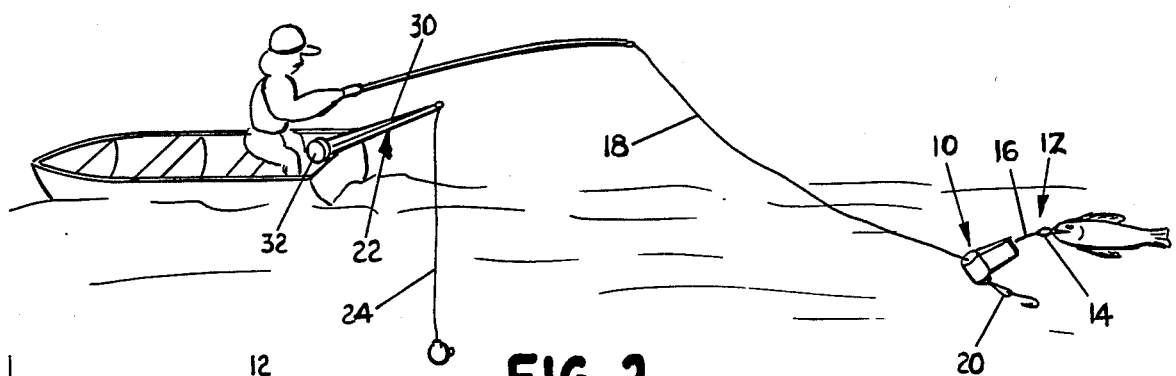
FIG. 2 is a perspective diagrammatic view of the present invention after a strike by a fish and disengagement of the downrigger system.

Turning now to FIG. 2, the fishing rig retainer 10 of the present invention is shown in the disengaged or released state. After a fish has struck the second fishing lure 14 associated with the fishing rig 12, the fishing rig retainer becomes disengaged and slides down the primary fishing line. When the retainer slides down to the downrigger release clip, the pull of the fish on the hook releases the fishing line from the release clip and downrigger weight, allowing the fisherman to respond to the strike. The fishing rig retainer continues down the fishing line until it meets and is stopped by the first lure 20 at the end of the primary fishing line. As shown in FIG. 2, the downrigger system 22 remains at rest with the downrigger weight 26 in a position substantially below the downrigger system 22. When the fish is boated, the fishing rig retainer may be positioned and reengaged on the fishing line The downrigger weight is retrieved and the fishing line is reconnected to the release clip.

The preferred embodiment of the present invention is more fully revealed in FIGS. 3 through 6. The fishing rig retainer comprises a retention means or body 38 mounted on the primary fishing line and a connection means for connecting a secondary fishing rig to the fishing rig retainer. The connection means also serves as a clamping mechanism and comprises a plunger 34 attached to the secondary fishing rig 12 at an exterior end 35 of plunger 34. The exterior end 35 extends from the body 38 of the retainer to an eyelet 36 suitable as an attachment point for a fishing rig.

Figure 3:
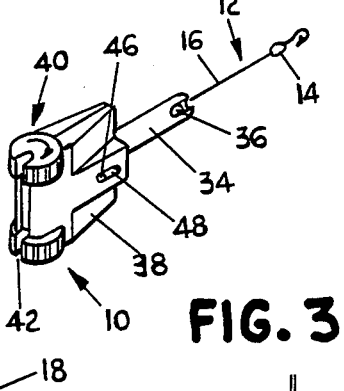
FIG. 3 is a perspective view showing the manner in which the present invention is mounted on a primary fishing line.

The body of the retainer extends around and partially encloses a rotatable barrel 40. The barrel is grasped by curved arms 43 extending from the body itself. The arms do not completely encircle the barrel and have a vertical opening or slot 44 which exposes a lengthwise slot 42 that is vertically cut into the rotatable barrel. Opening 44 and slot 42 are formed so that they may be aligned so that a fishing line can fit into the interior part of slot 42 through opening 44, as shown in FIG. 3. The slot extends completely through the length of the barrel and penetrates both ends. Adjacent to the slot, the fishing line 18 is shown substantially in vertical alignment with both the opening and the slot itself.

To mount the retainer on the primary fishing line, the slots are aligned as in FIG. 3 and then the line is inserted sideways into the slot in the barrel.

Figure 4:
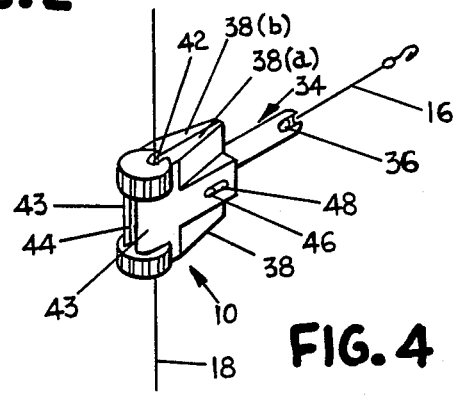
FIG. 4 is a perspective view of the present invention installed on a fishing line.

The rotatable barrel is then rotated to a position 180° from the position shown in FIG. 3, as shown in FIG. 4, to enclose the primary fishing line in the body of the retainer. The fishing line 18 thus enters the rotatable barrel from the slot as viewed from the top and exits the slot from the bottom of the fishing rig retainer Body 38 is fashioned from two halves 38(a) and 38(b), that are ultimately joined together by fasteners 39. The curved arms 43 of the body (FIG. 6) have an interior cylindrical radius that approximates the outer diameter of the barrel core 41, and an overall vertical dimension that allows the barrel flanges 37 to be exposed at the top and bottom of the assembled retainer.

Figure 5:
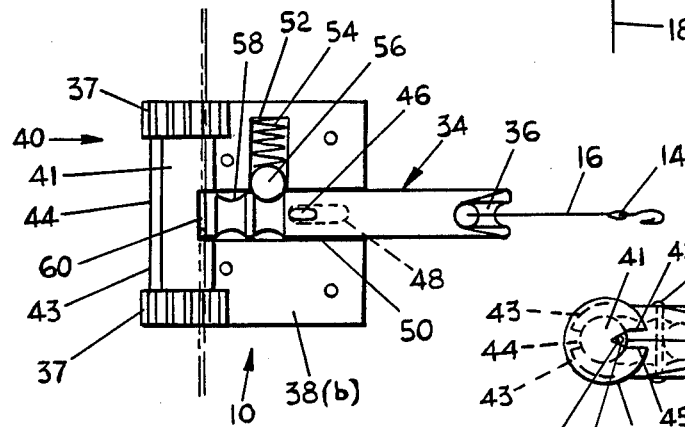
FIG. 5 is a elevational view of the present invention installed on a fishing line in the engaged position, with one of the sides of the body being removed to illustrate the interior of the body.
Figure 6:
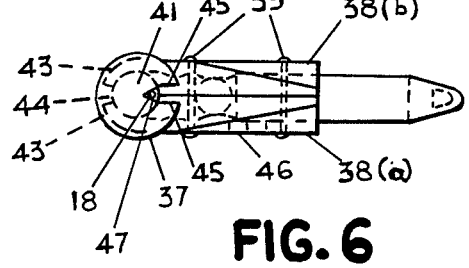
FIG. 6 is a top plan view of the present invention.

The interior features of the present invention are shown in FIGS. 5 and 6, where the complete construction of the plunger 34 is shown as it resides in cylindrical opening 50. At the inner end opposite from the eyelet 36, the plunger is formed with two detents, forward detent 58 and rear detent 59. The radius of both detents corresponds approximately to the outer diameter of a ball 56. The ball is disposed within a recess 52 and is biased downwards towards the detents in the plunger by means of a spring 54. As shown in FIG. 5, when fishing line 18 passes through the slot it is oriented such that it is transversely oriented with respect to the inner end 60 of the plunger and continues on to exit at the bottom of the retainer. The plunger end fits into a flattened and enlarged portion of the slot adjacent the end of the plunger and compresses the line against the back of the slot when the plunger end is fully extended, thus affirmatively securing the retainer to the fishing line The rear detent 59 resiliently locks the plunger in a retaining position in cooperation with the ball 56 and spring 52. The fishing line and retainer are represented in the retaining position in FIG. 5.

In the preferred embodiment, the slot has sides 45 and V-shaped inner end 47. The sides are compatibly spaced to provide a slot width approximately equal to the width of opening 44. The inner end of the slot is flat at least at the end of the plunger and is oriented to provide a slot depth equal to the desired length of extension of the plunger end.

The distance between the rear detent and the slot surface is very important. A clamping force is developed by a cam action bias as ball 56 is urged towards seating in the rear detent by spring 54. The breach of the normal tolerance produced by the presence of the primary fishing line between the plunger end and the slot surface causes a corresponding displacement of the alignment of the rear detent and the ball. The new alignment is resisted by the combined action of the spring and ball, and thus resistance is directed towards the plunger end. The larger the diameter of the fishing line the more resistance or clamping force is developed until limited by dimensional or performance parameters.

The plunger end transmits the clamping force to the fishing line in the retained position. It is believed that a slight deformation of the fishing line takes place as a reaction to the clamping force and may contribute to the resultant grip between the retainer and the fishing line. Normally, the clamping force transmitted by the plunger end would be expected to cause frictional engagement between the retainer and the fishing line.

In the disengaged position of the present invention, the plunger 34 is caused by the strike of a fish to be pulled away from the fishing line 18. The engagement of forward detent 58 with the downwardly biased ball resiliently holds the plunger in its deactuated position until the plunger is manually pushed in to reset the retainer on the line. Also located on the plunger is a pin 46 which extends as a protrusion from the side of the plunger and is best shown in FIGS. 3 and 4 extending through the channel 48 in the side of the body. The pin and channel mechanism limit the inward and outward movement of the plunger.

The advantage of the present invention becomes apparent when used with a downrigger system. Typically the retainer of the present invention is positioned above the release at a distance calculated to keep it within the vicinity of the school of game fish being sought. When a strike occurs on the first lure, the downrigger release clip is actuated, and the fisherman retrieves the fish normally. However, if a fish should strike the second lure trailing from the present invention, the plunger is actuated and this overcomes the bias on the rear detent holding the plunger in the engaged position. The plunger is withdrawn from contact with the fishing line and becomes positioned where the ball is positioned in the forward detent and holds the plunger in its withdrawn position. In this position, the fishing rig retainer is no longer engaging the fishing line by means of the plunger compressing against the fishing line and the slot surface The retainer is still attached to the fishing line physically, although now it may be slidably moved to the point where it causes the release of the downrigger weight and thereafter until it meets the first fishing lure at the end of the fishing line. At this point the fisherman may reel in the fish virtually the same as he would normally.

The plunger may travel within the cylinder 50 but is generally restricted by the action of the pin 46 within the channel 48. Thus the travel of the plunger is predetermined by the length of the channel.

The installation of the fishing rig retainer to the fishing line commences with the orientation of the rotatable barrel to a position where the slot and the opening are aligned. The fishing line may then be inserted into the slot of the barrel and the barrel rotated to a position 180° from the opening. The barrel is gripped by the arms extending from the body of the fishing lure holder to the extent that the rotation of the barrel has to be manually implemented. With the fishing line so installed the fishing lure holder is affirmatively retained to the line without more.

The actual engagement or anchoring of the retainer to the fishing line is accomplished by manually extending the plunger into the body so as to cause the plunger end to seat into the slot as described above. Removal of the retainer from the fishing line requires a reversal of the installation procedure, keeping in mind that the barrel cannot rotate whenever the plunger end is seated within the slot.

The fishing rig attached to the fishing rig retainer of the present invention is connected to an eyelet on the end of the plunger The eyelet may be molded into the component plunger part, or it may be expanded to include a swivel connection of the type generally used in fishing. The overall construction of the lure holder can be of plastic or treated wood, the only requirements being water resistance and the lack of extraordinary buoyancy or weight. In the preferred embodiment, the ball is constructed of nylon because of its relative availability and characteristic lubricity. The balance of the present invention is constructed from an injectable plastic resin except for the spring. This does not represent a limitation, however, as the materials of construction remain essentially an engineering selection.

The foregoing description of the preferred embodiment is illustrative of the practice of the present invention. Modifications of the preferred embodiment can be made without altering the scope and the spirit of the concepts employed in the present invention.

The embodiments of the invention in which an exclusive property or privilege is claimed are defined as the following:

1. A fishing rig retainer means for installing a secondary fishing rig and hook to a primary fishing line, the fishing rig retainer means comprising a retention means slidably mounted for movement along the primary fishing line and a connection means for attaching the secondary fishing rig to the retention means, the connection means being movably mounted in the retention means between a retained position, where the connection means cause he retention means to be held on the primary fishing line at a given longitudinal position on the primary fishing line, and a released position, where the retention means can slide freely along the primary fishing line, the connection means moving from its retained position to its released position by the exertion of a pull on the secondary fishing rig with a predetermined force representative of a fish on the secondary fishing rig, the retention means comprising a body with an internal opening therethrough, the primary fishing line extending through the internal opening, and the connection means comprising a plunger slidably mounted within the body and longitudinally movable in a transverse direction relative to the direction of the fishing line as it extends through the internal opening, the plunger being movable between a retained position, wherein an inner end of the plunger extends into the slot so as to engage the primary fishing line and hold it in a fixed position with respect to the fishing rig retainer means, and a released position, wherein the plunger is withdrawn from the primary fishing line holding position, the plunger being resiliently held in place when in its retained position, the secondary fishing line being attached to the connection means such that a pull on the secondary fishing rig representative of a fish taking the hook on the secondary fishing rig causes the plunger to move from its retained position to its released position, releasing the primary fishing line such that the fishing rig retainer means can slide along the primary fishing line, the slidable plunger having an exterior end opposite the inner end, the exterior end protruding out of the body and having attachment means thereon for fastening the secondary fishing rig to the plunger, the plunger having a pair of axially spaced detents therein and the body including an outwardly biased projection mounted transversely to the detents for engaging either detent, depending on the axial position of the plunger, the projection resiliently holding the plunger in its retained position when engaging one detent and holding the plunger in tis released position when engaging the other detent.

2. A fishing rig retainer means as in claim 1 wherein:
the retention means comprises a body with an elongated barrel rotatably mounted therein, the barrel having a longitudinal slot extending through the length of the barrel, the primary fishing line running through the slot in the barrel, the body having a slotted side adjacent a portion of the barrel, the barrel being rotatable to an open position wherein the barrel slot mates with the body slot and permits sideways insertion of the fishing line through the body into the barrel slot, the barrel being rotatable to a closed position wherein the barrel slot in the body is enclosed in the body so as to prevent sideways removal of the fishing line from the barrels slot; and
the plunger has an inner end that extends into the barrel slot when the barrel slot is in its closed position so as to engage the primary fishing line and hold it in a fixed position with respect to the fishing rig when the retainer means is in its retained position.

3. A fishing rig retainer means as in claim 1 wherein the projection is a ball biased into contact with the plunger by a spring, the detents being curved recesses that are engaged by the ball, the engagement between the ball and the recesses producing a resilient biasing force urging the plunger to remain in whichever retained or released position it is in, an axial force of preselected magnitude being sufficient to move the plunger to the other position.

4. A fishing rig retainer as in claim 3 wherein a pin extends from the side of the plunger and fits in an elongated slot in the body, the pin and slot limiting the plunger to axial movement between its retained and released positions.

5. A fishing rig retainer for installing a secondary fishing rig and lure to a primary fishing line comprising:
a body having a pair of curved arms extending outwardly therefrom, with a cylindrical opening being formed between the curved arms, the arms having outer ends that are spaced apart;
a rotatable barrel mounted in the body with a lengthwise slot for the receipt of the primary fishing line, the arms of the body extending substantially around a central portion of the barrel operably securing the barrel to the body, the opening between the arms being longitudinally oriented and aligned with the slot in the barrel at least at one radial position of the barrel, the barrel being rotatable from an open position where the interior of the slot communicates with the opening between the arms and compatibly receives the primary fishing line, to a closed position where the interior of the slot is enclosed by the body and slidably retains the primary fishing line;

a plunger reciprocably mounted in the body with an exterior end and an inner end, the plunger being slidably movable in transverse relation to the barrel and having a retained position, where the inner end is extended into the slot of the barrel when the barrel is in its closed position and a clamping force is maintained on the primary fishing line between the slot and the inner end, and a released position, where the inner end is withdrawn from the primary fishing line, the plunger being resiliently maintained in its retained position after it has placed in that position, the exterior end of the plunger having an eyelet to which the secondary fishing rig is attached, a pull on the secondary fishing rig representative of a fish on the hook thereof being sufficient to move the plunger from its retained position to its released position.

* * * * *